Oct. 6, 1964 A. STEINER 3,151,542
METHOD OF MARKING CONTAINERS
Filed March 6, 1962
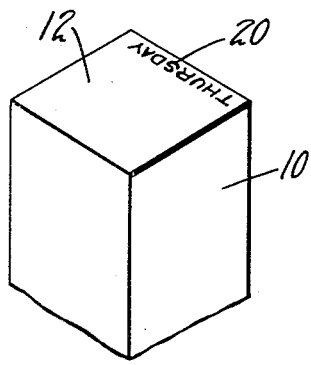
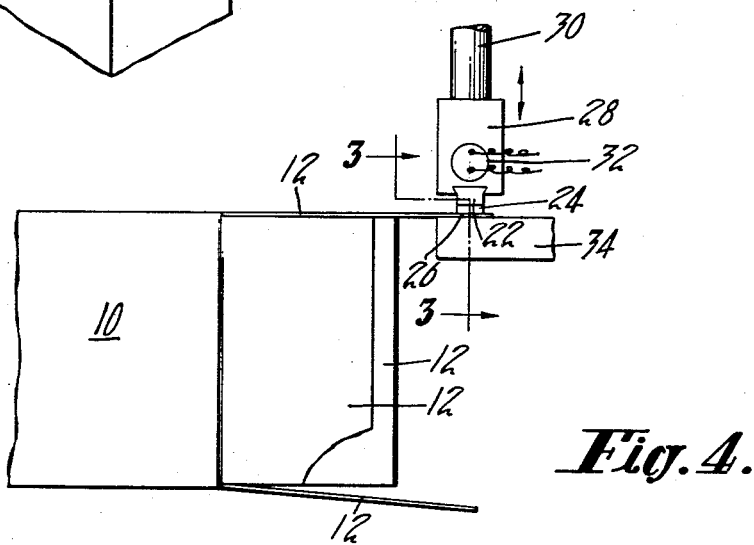
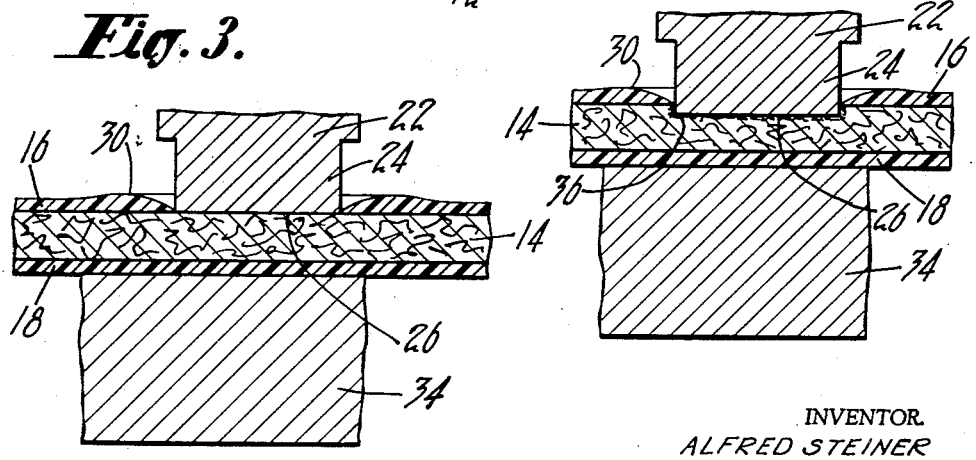
INVENTOR.
ALFRED STEINER
BY
ATTORNEYS

United States Patent Office 3,151,542
Patented Oct. 6, 1964

3,151,542
METHOD OF MARKING CONTAINERS
Alfred Steiner, Irvington, N.J., assignor to American Can Company, New York, N.Y., a corporation of New Jersey
Filed Mar. 6, 1962, Ser. No. 177,893
2 Claims. (Cl. 101—32)

The present invention relates to container marking and has particular reference to a method of providing a milk carton made of polyethylene coated fibre stock with a legible date marking.

In many communities, ordinances require that all retail milk containers be legibly marked with the day of the week on which they are filled in order to prevent stale milk from being sold to the public. Heretofore, most fibre milk cartons have had their exposed surfaces coated with paraffin wax compositions, and a conventional way of legibly marking such cartons has been to actually print a colored date mark on them by means of some heat transfer printing method. One such marking method is illustrated in Ronald E. J. Nordquist, et al. Patent 2,369,172 wherein a thermoplastic marking ribbon is interposed between the carton and a heated die, the ribbon being moved at intervals in order to constantly present a fresh surface to the carton. This method is not ideal, however, since the ribbons are expensive and messy, and necessitate replacement at regular intervals.

Recently, the container making industry has developed a fibre milk carton made from fibre stock which has its exposed surfaces coated with thin films of polyethylene. The present invention contemplates a very satisfactory and practical method of providing such cartons with date marks by pressing into a wall of the carton a marking die which has been heated to a minimum temperature of at least 500° F. The temperature of the die is well above the heat distortion and melting temperature of the polyethylene film. As a result, the polyethylene film which is contacted by the die breaks up, and the melted polyethylene shrinks and seems to actually flow away from beneath the die, thus exposing the underlying fibre stock and permitting the die to char the fibres of the fibre stock to form a permanent mark, brownish in color, which contrasts with the normally whitish color of the fibre stock and thus is clearly visible to the ultimate consumer of the milk package, and which, for all practical purposes, cannot be obliterated or concealed. Because of the high die tempereatures used, there is no build up of polyethylene on the die, and the die maintenance is reduced to a minimum.

An object of the invention, therefore, is the provision of a method of forming a clearly legible, permanent mark on a polyethylene coated fibre carton by the utilization of a branding die which is heated to a tempereature which prevents the accumulation of polyethylene on the die.

Another object is the provision of a method of forming a permanent date mark of contrasting color on a surface of a polyethylene coated fibre carton without requiring the use of ink or other colored printing materials, and without necessitating a pretreatment of the polyethylene coating.

Still another object of the invention is the provision of a convenient, economical, and practical method of marking polyethylene coated fibre cartons.

Numerous other objects and advantages of the invention will be apparent as it is better understood from the following description, which, taken in connection with the accompanying drawings, discloses a preferred embodiment thereof.

Referring to the drawings:

FIGURE 1 is a perspective view of the upper portion of a polyethylene coated fibre carton which has been date marked by the method of the instant invention;

FIG. 2 is an elevational view showing the instant method invention being carried out by an appropriate marking mechanism, parts being broken away;

FIG. 3 is an enlarged fragmentary section taken substantially along the line 3—3 in FIG. 2 and showing an early phase of the date marking operation; and FIG. 4 is a section similar to FIG. 3 but showing the marked carton at the completion of the marking operation.

As a preferred and exemplary embodiment of the instant invention, the drawings show a tubular carton 10 made from a single folded blank of sheet material and adapted to contain a product such as milk or the like. The carton 10 is substantially square in cross-section and has its bottom end closed in any suitable manner (not shown). In the form illustrated, the carton has its upper end closed by four end flaps 12 which are adapted to be folded one upon the other and adhered to each other to form a liquid tight top end construction. It will be understood, however, that the instant invention is applicable to polyethylene coated fibre cartons of any type construction.

As best seen in FIGS. 3 and 4, the carton 10 is formed of sheet material which comprises a main fibre layer 14, preferably composed of paperboard stock, the opposite surfaces of which are coated with thin transparent films 16, 18 of polyethylene which may range from .0005 to .002 inch in thickness and which provide smooth continuous surfaces which are resistant to water, moisture, grease and oil.

In order to comply with local ordinances in many communities, an exposed portion of the top end of the carton 10 must be provided with a clearly legible date marking 20 (see FIG. 1). In most localities, the date marking 20 need only comprise the name of the day on which the carton 10 is filled with the milk product. This date marking 20 may be applied to the container either before or after filling. In the illustrated form of the invention, the date marking 20 is applied to the top flap 12 of the carton prior to the time the flaps are finally folded together to form the top end seal, and may be done in a carton forming and setting-up machine.

In the illustrated embodiment of the instant invention, the date marking 20 is made by pressing a hot marking die 22 against the outside surface of a carton flap 12. The marking die 22 may comprise a metal logotype containing a plurality of raised letters 24, the faces 26 of which spell out the name of the day of filling, or may comprise a group of individual metal types arranged to spell out the desired name.

The die 22 is mounted in a metal die holder 28 which is secured to a reciprocating rod 30. In order to heat the die 22 to the desired temperature, the die holder 28 carries an electrical resistance heating unit 32, such as a Calrod cartridge, the heat from which is transferred through the die holder 28 to the die 22 by conduction. The actual temperature to which the marking die 22 need be heated varies inversly with the length of time which the die 22 is maintained in contact with the carton flap 12, but should range from a minimum of about 500° F. to a maximum of about 800° F. The optimum marking cycle for a die having a temperature of about 800° F. is about 0.03 second.

As seen in FIG. 2 the carton flap 12 which is to be marked is positioned against the supporting anvil 34, which may be water-cooled to prevent it from becoming overheated. Next, the hot marking die 22 is pressed firmly against the opposite surface of the flap 12 so that it initially contacts the polyethylene film 16 which has a softening point of about 200° F. and a melting point of 220° F. As a result of its high temperature, the die 22 causes the polyethylene film 16 to melt almost immediately and to shrink or flow rapidly away from the die, so that most of the polyethylene which is disposed between the type faces 26 and the fibre layer 14 flows laterally from beneath the type and accumulates around its edge in slightly thickened areas 30, as best seen in FIG. 3, thereby exposing the underlying fibre layer 14 to the hot die 22. It is believed that the amount of polyethylene remaining beneath the type is inconsequential.

The pressure on the die 22 is then continued so that the die embeds itself in the fibre layer 14, as shown in FIG. 4, and the hot die 22 is held in this embedded position in the flap 12 until it actually chars the immediately adjacent fibres of the stock and changes their color from an original whitish tone to a brownish tone which contrasts sharply with the surrounding uncharred fibre stock. This charred portion of the stock is indicated by the dark area 36 in FIG. 4.

When the desired change in color has been obtained, the hot die 22 is withdrawn, thus completing the marking operation which provides the carton with the sharply delineated date marking 20 which is clearly legible and pleasing to the eye, and which cannot be obliterated without leaving obvious indications of tampering.

It is thought that the invention and many of its attendant advantages will be understood from the foregoing description and it will be apparent that various changes may be made in the steps of the method described and their order of accomplishment without departing from the spirit and scope of the invention or sacrificing all of its material advantages, the method hereinbefore described being merely a preferred embodiment thereof.

I claim:

1. The method of providing a fibre carton having polyethylene coated surfaces with a legible marking, comprising heating a marking die to a temperature well above the melting point of polyethylene and sufficiently high to char the fibre portion of the carton, pressing said heated die against one of the coated surfaces of the carton to break down the polyethylene film thereon and cause it to flow away from the die while supporting the carton on an anvil in contact with the other of said coated surfaces, indenting said die into the underlying fibre carton stock and maintaining it in contact with said stock to char and discolor the adjacent portion of said stock to thereby create a clearly legible marking which differs in color from the surrounding uncharred portion of the carton, and simultaneously cooling the anvil in contact with said other coated surface.

2. The method of claim 1 wherein said die is heated to a temperature of at least about 500° F.

References Cited in the file of this patent

UNITED STATES PATENTS

| | | |
|---|---|---|
| 1,665,467 | Miller | Apr. 10, 1928 |
| 1,902,543 | Dickson | Mar. 21, 1933 |
| 2,369,172 | Nordquist et al. | Feb. 13, 1945 |
| 2,501,495 | Carroll et al. | Mar. 21, 1950 |
| 2,686,744 | Cornwell | Aug. 17, 1954 |
| 2,740,351 | Anderson | Apr. 3, 1956 |